April 4, 1939.  H. BANY  2,152,782
CIRCUIT BREAKER CONTROL SYSTEM
Filed Jan. 21, 1938
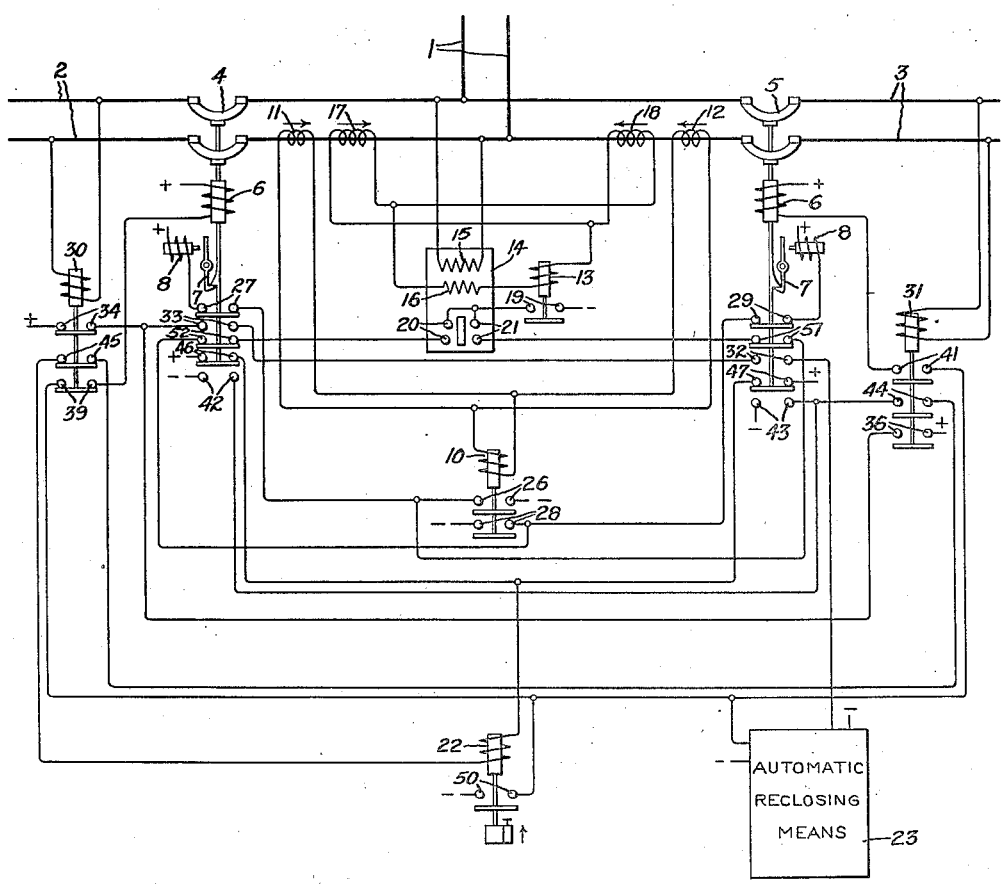
Inventor:
Herman Bany,
by Harry E. Dunham
His Attorney.

Patented Apr. 4, 1939

2,152,782

UNITED STATES PATENT OFFICE 2,152,782

CIRCUIT BREAKER CONTROL SYSTEM

Herman Bany, Lansdowne, Pa., assignor to General Electric Company, a corporation of New York Application January 21, 1938, Serial No. 186,093

6 Claims. (Cl. 175—294)

My invention relates to circuit breaker control systems and particularly to such a system for controlling the opening and reclosing of a plurality of circuit breakers respectively connecting different supply circuits to a common load circuit and its object is to provide an improved circuit breaker control system of this type whereby the desired protection and continuity of service may be obtained without requiring an overload circuit breaker in the load circuit.

My invention will be better understood from the following description when taken in connection with the accompanying drawing the single figure of which diagrammatically illustrates an automatic reclosing circuit breaker system embodying my invention, and its scope will be pointed out in the appended claims.

Referring to the drawing, 1 represents a load circuit which is arranged to be supplied with current by two supply or feeder circuits 2 and 3. While I have shown single phase circuits in order to simplify the disclosure, it will be evident to those skilled in the art that my invention is also applicable to polyphase and direct current circuits.

The feeder circuits 2 and 3 are respectively connected to the load circuit 1 by the circuit breakers 4 and 5 which may be of any suitable type, examples of which are well known in the art. As shown in the drawing, the circuit breakers 4 and 5 are of the latched-in type and each comprises a closing coil 6 which, when energized, closes the associated circuit breaker, a latch 7 for maintaining the associated circuit breaker in its closed position, and a trip coil 8 which, when energized, releases the associated latch 7 to permit the associated circuit breaker to open.

For effecting the opening of the two circuit breakers 4 and 5 in response to a fault on the load circuit 1, I provide an overcurrent relay 10 which is connected in any suitable manner so that it is energized in accordance with the sum of the currents respectively supplied by the feeder circuits 2 and 3 to the load circuit 1. As shown in the drawing, this result is accomplished by connecting the overcurrent relay 10 to the secondary windings of the current transformers 11 and 12, the primary windings of which are respectively connected in series relation with the feeder circuits 2 and 3. The secondary windings of the transformers 11 and 12 are connected together so that their voltages are normally in opposition. The overcurrent relay 10, when sufficiently energized to close its contacts, completes energizing circuits for the trip coil 8 of each circuit breaker that is in its closed position.

For effecting the disconnection of a faulty feeder circuit from the load circuit 1 without effecting the disconnection of the other feeder circuit from the load circuit, I provide a balanced current protective system including a current relay 13 and a directional relay 14 which has a voltage winding 15 connected to a suitable source of voltage such as the load circuit 1 and a current winding 16 which is connected in series with the winding of the current relay 13 to the parallel connected secondary windings of the current transformers 17 and 18, the primary windings of which are respectively connected in series relation with the feeder circuits 2 and 3. The secondary windings of the transformers 17 and 18 are connected for circulating currents and the current winding 16 of the relay 14 is connected to the secondary windings of the transformers 17 and 18 in such a manner that the direction of the current flow through the winding 16 depends upon the relative magnitudes and directions of the currents in the feeder circuits 2 and 3. Normally current flows from each feeder circuit to the load circuit and the difference in these two currents is not large enough to operate the overcurrent relay 13. When, however, a fault occurs on one of the feeder circuits, the current in the faulty feeder reverses due to the fact that current is supplied to the faulty feeder circuit from the other feeder circuit. Due to this change in the direction of current flow, sufficient current flows through the overcurrent relay 13 to cause it to close its contacts 19 and the direction of this difference current through the current winding 16 of the relay 14 is such that if the fault is on the feeder 3, contacts 20 of the relay 14 are closed to complete an energizing circuit for the trip coil 8 of the circuit breaker 5, and if the fault is on the feeder circuit 2, the contacts 21 of the relay 14 are closed to complete an energizing circuit for the trip coil 8 of the circuit breaker 4.

After a fault has effected the opening of one of the circuit breakers 4 and 5, it is desirable to reclose it when its associated feeder circuit is energized. Also, when both of the circuit breakers 4 and 5 are opened simultaneously, it is desirable to reclose both of them simultaneously if their respective feeder circuits are energized. For accomplishing these results, I provide in the particular arrangement shown in the drawing a time relay 22 which is so connected that it is energized in response to the opening of either of the circuit breakers 4 and 5 if the other circuit breaker is closed and the voltage of the supply circuit associated with the open circuit breaker is above a predetermined value. This time relay 22, when energized, completes an energizing circuit for the closing coil 6 of each circuit breaker when each is in its open position and the associated feeder circuit is energized. Also, I provide suitable automatic reclosing means for effecting the simultaneous reclosures of said circuit breaker a predetermined number of times with predetermined time intervals between successive reclosure when both of the circuit breakers 4 and 5 are open and both of the feeder circuits 2 and 3 are energized. Since such automatic reclosing means are well known in the art and the detailed circuits thereof form no part of my present invention, I have represented such automatic reclosing means by a rectangle 23. United States Patent 1,784,651, granted December 9, 1930, on an application filed by Arvid E. Anderson and assigned to the assignee of this application, discloses the details of an automatic reclosing circuit breaker arrangement which may be used in connection with my present invention to effect a predetermined number of successive reclosures of the circuit breakers 4 and 5 with predetermined time intervals between successive reclosures. In the arrangement shown in the drawing, the automatic reclosing means 23 is set into operation only in response to both of the circuit breakers 4 and 5 being open, and is normally arranged to effect the simultaneous reclosure of both circuit breakers a predetermined number of times with predetermined time intervals between successive reclosures if the associated feeder circuits are energized. Relays 30 and 31 are voltage relays which are respectively energized by the voltages of the feeder circuits 2 and 3.

The operation of the arrangement shown in the drawing is as follows: Under normal operating conditions, the circuit breakers 4 and 5 are closed so that the feeder circuits 2 and 3 supply current in parallel to the load circuit 1. When a fault occurs on the load circuit 1, the current supplied to this fault by the two feeder circuits 2 and 3 is sufficient to operate the overcurrent relay 10 so that it closes its contacts 26 and 28. By closing its contacts 26, the relay 10 completes through the contacts 27 of the circuit breaker 4 an energizing circuit for the trip coil 8 of the circuit breaker 4 so that the feeder circuit 2 is disconnected from the load circuit 1. By closing its contacts 28, the relay 10 completes through the contacts 29 of the circuit breaker 5 an energizing circuit for the trip coil 8 of the circuit breaker 5 so that the feeder circuit 3 is disconnected from the load circuit 1.

If the voltage for either of the feeder circuits 2 and 3 is above a predetermined value when the circuit breakers 4 and 5 are both open, a starting circuit is completed for the automatic reclosing means 23 through the contacts 32 of the open circuit breaker 5, the contacts 33 of the open circuit breaker 4, and contacts 34 of the relay 30 if the feeder circuit 2 is energized. If the feeder circuit 3 is energized, the starting circuit for the automatic reclosing means 23 is also completed through the contacts 36 of the relay 31 which are connected in parallel with the contacts 34 of the relay 30. If the feeder circuit 2 is energized after the automatic reclosing means 23 has been in operation for a predetermined time, an energizing circuit is completed through the contacts 39 of the relay 30 for the closing coil 6 of the circuit breaker 4 to reconnect the energized feeder circuit 2 to the load circuit 1. If the feeder circuit 3 is energized after the automatic reclosing means 23 has been in operation for a predetermined time, an energizing circuit is also completed by the reclosing means 23 for the closing coil 6 of the circuit breaker 5 through the contacts 41 of the voltage relay 31 to reconnect the load circuit 1 to the feeder circuit 3. Thus when both circuit breakers 4 and 5 are open the automatic reclosing means 23 effect the reclosing of each circuit breaker whose associated feeder circuit is energized.

If the fault is still connected to the load circuit 1, the overcurrent relay 10 effects the opening of the circuit breakers 4 and 5 and after a predetermined time interval the automatic reclosing means 23 effects another reclosure of the two circuit breakers. This sequence of operation may be repeated a predetermined number of times after which the automatic reclosing means 23 is rendered inoperative, in a manner well known in the art, to effect further reclosures of the circuit breakers.

When a fault occurs on either of the feeder circuits 2 and 3, the relays 13 and 14 operate in a well known manner to effect the opening of the circuit breaker which connects the faulty feeder circuit to the load circuit 1. For example, if the fault occurs on the feeder circuit 2, a circuit is completed through contacts 19 of relay 13, contact 21 of relay 14, contacts 51 of circuit breaker 5 and contacts 27 of circuit breaker 4 for the trip coil 8 of circuit breaker 4. By closing its contacts 42, the circuit breaker 4 completes an energizing circuit for the time relay 22 if both of the feeder circuits 2 and 3 are energized and the circuit breaker 5 is closed. This energizing circuit for the time relay 22 includes the contacts 42 of the circuit breaker 4, contacts 44 of the relay 31, contacts 45 of relay 30, and contacts 47 of circuit breaker 5. Therefore, after the circuit breaker 4 has remained opened for a predetermined time, determined by the setting of the relay 22, and if the other circuit breaker 5 is closed, an energizing circuit is completed through contacts 50 of relay 22 and contacts 39 of relay 30 for the closing coil 6 of the open circuit breaker 4.

If the fault is on the load circuit 3 instead of the load circuit 2, a circuit is completed through contacts 19 of relay 13, contacts 20 of relay 14, contacts 52 of circuit breaker 4 and contacts 29 of circuit breaker 5 for the trip coil 8 of the circuit breaker 5. By closing its contacts 43, the circuit breaker 5 completes an energizing circuit for time relay 22 if both of the feeder circuits 2 and 3 are energized and the circuit breaker 4 is closed. This energizing circuit for the relay 22 includes the contacts 43 of circuit breaker 5, contacts 44 of relay 31, contacts 45 of relay 30 and contacts 46 of closed circuit breaker 4. The relay 22, by closing its contacts 50, completes an energizing circuit for the closing coil 6 of the circuit breaker 5 through contacts 41 of the relay 31.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a load circuit, two supply circuits, a separate circuit breaker between said load circuit and each supply circuit, means responsive to a fault on said load circuit for opening both of said circuit breakers, means responsive to a fault on either supply circuit for effecting the opening of only the circuit breaker between the faulty supply circuit and the load circuit, means controlled by said circuit breakers for effecting the simultaneous reclosure of said circuit breakers a predetermined time after they are both in their open positions, and means controlled by said circuit breakers for effecting the reclosure of either of said circuit breakers only when it is open and the other circuit breaker is closed and the voltages of both supply circuits are above predetermined values.

2. In combination, a load circuit, two supply circuits, a separate circuit breaker between said load circuit and each supply circuit, means responsive to a fault on said load circuit for opening both of said circuit breakers, means responsive to a fault on either supply circuit for effecting the opening of only the circuit breaker between the faulty supply circuit and the load circuit, means controlled by said circuit breakers for effecting the simultaneous reclosure of said circuit breakers a predetermined number of times with predetermined time intervals between successive reclosures when both of said circuit breakers are open, and means dependent upon one of said circuit breakers being open and the other closed for effecting the reclosure of the open circuit breaker a predetermined time after it is opened.

3. In combination, a load circuit, two supply circuits, a separate circuit breaker between said load circuit and each supply circuit, means responsive to a fault on said load circuit for opening both of said circuit breakers, means responsive to a fault on either supply circuit for effecting the opening of only the circuit breaker between the faulty supply circuit and the load circuit, means controlled by said circuit breakers and the voltages of said supply circuits for effecting the simultaneous reclosure of said circuit breakers a predetermined time after they are both in their open positions, and means controlled by said circuit breakers and the voltages of said supply circuits for effecting the reclosure of either of said circuit breakers when it is open and the other circuit breaker is closed and the voltages of both supply circuits are above predetermined values.

4. In combination, a load circuit, two supply circuits, a separate circuit breaker between said load circuit and each supply circuit, means responsive to a fault on said load circuit for opening both of said circuit breakers, means responsive to a fault on either supply circuit for effecting the opening of only the circuit breaker between the faulty supply circuit and the load circuit, means controlled by said circuit breakers and the voltages of said supply circuits for effecting the simultaneous reclosure of said circuit breakers a predetermined number of times with predetermined time intervals between successive reclosures when both of said circuit breakers are in their open positions and the voltages of said supply circuits are above predetermined values, and means controlled by said circuit breakers and the voltages of said supply circuits for effecting the reclosure of either of said circuit breakers when it is open and the other circuit breaker is closed and the voltages of both supply circuits are above predetermined values.

5. In combination, a load circuit, two supply circuits, a separate circuit breaker between said load circuit and each supply circuit, means responsive to a fault on said load circuit for opening both of said circuit breakers, means responsive to a fault on either supply circuit for effecting the opening of only the circuit breaker between the faulty supply circuit and the load circuit, means controlled by said circuit breakers and the voltages of said supply circuits for effecting the simultaneous reclosure of said circuit breakers a predetermined time after they are both opened, a time relay, means controlled by said circuit breakers and the voltages of said supply circuits for completing an operating circuit for said time relay only when one of said circuit breakers is open and the other circuit breaker is closed and the voltages of said supply circuits are above predetermined values, and means responsive to the operation of said time relay for reclosing each circuit breaker that is open.

6. In combination, a load circuit, two supply circuits, a separate circuit breaker between said load circuit and each supply circuit, means responsive to a fault on said load circuit for opening each of said circuit breakers, means responsive to a fault on either supply circuit for effecting the opening of only the circuit breaker between the faulty supply circuit and the load circuit, means controlled by said circuit breaker and the voltages of said supply circuits for simultaneously effecting a predetermined number of times with predetermined time intervals between successive reclosures the reclosure of each circuit breaker whose associated supply circuit is energized when both of said circuit breakers are open, and means controlled by said circuit breakers and the voltages of said supply circuits for effecting the reclosure of either of said circuit breakers when it is open and the other circuit breaker is closed and the voltages of both supply circuits are above predetermined values.

HERMAN BANY.